United States Patent [19]
Mohler et al.

[11] Patent Number: 5,752,862
[45] Date of Patent: May 19, 1998

[54] POWER TRAIN LAYOUT FOR AN AMPHIBIOUS VEHICLE

[75] Inventors: Thomas Hynes Mohler, Santa Clara; Russell Carter Inghram, San Jose, both of Calif.

[73] Assignee: United Defense, L.P., Arlington, Va.

[21] Appl. No.: 719,600

[22] Filed: Sep. 25, 1996

[51] Int. Cl.$^6$ .................................................. B63H 11/00
[52] U.S. Cl. ........................... 440/38; 440/75; 114/270
[58] Field of Search ............................ 440/38, 39, 40, 440/41, 42, 46, 69, 75; 114/270; 60/220, 221

[56] References Cited

U.S. PATENT DOCUMENTS

| | | | |
|---|---|---|---|
| 1,716,400 | 6/1929 | Weis | 440/38 |
| 3,250,239 | 5/1966 | Garate | 114/270 |
| 3,395,672 | 8/1968 | Ruf | 114/270 |
| 5,027,737 | 7/1991 | Duffty et al. | 114/270 |
| 5,203,728 | 4/1993 | Kobayashi | 440/69 |
| 5,231,946 | 8/1993 | Giles | 440/38 |
| 5,579,711 | 12/1996 | Thomas | 114/270 |
| 5,628,272 | 5/1997 | Thomas | 114/270 |

*Primary Examiner*—Stephen Avila
*Attorney, Agent, or Firm*—Douglas W. Rudy; Michael B.K. Lee

[57] ABSTRACT

A center mounted power train configuration for a high water speed tracked amphibious vehicle which mounts the engine above the waterjet inlet plenum to shorten the power train length, so as to allow the vehicle length and weight to be optimized for land and water mobility. The short power train length provides for use of alternate longer components which may be required to obtain adequate power and thrust. Center mounting the power train reduces air ingestion into the waterjets and maximizes the sharing of support structure to lighten the vehicle. Center mounting of the power train also optimizes efficiency by using one propulsion gearbox to transfer power and improves access to components for repair or replacement. The power train arrangement features a rearward center of gravity for enhanced land and water mobility and provides space for locating personnel, for mission equipment and for access to floor level suspension components. Centermounting of the power train provides straight unobstructed aisleways on each side of the vehicle for personnel egress and ingress.

8 Claims, 5 Drawing Sheets

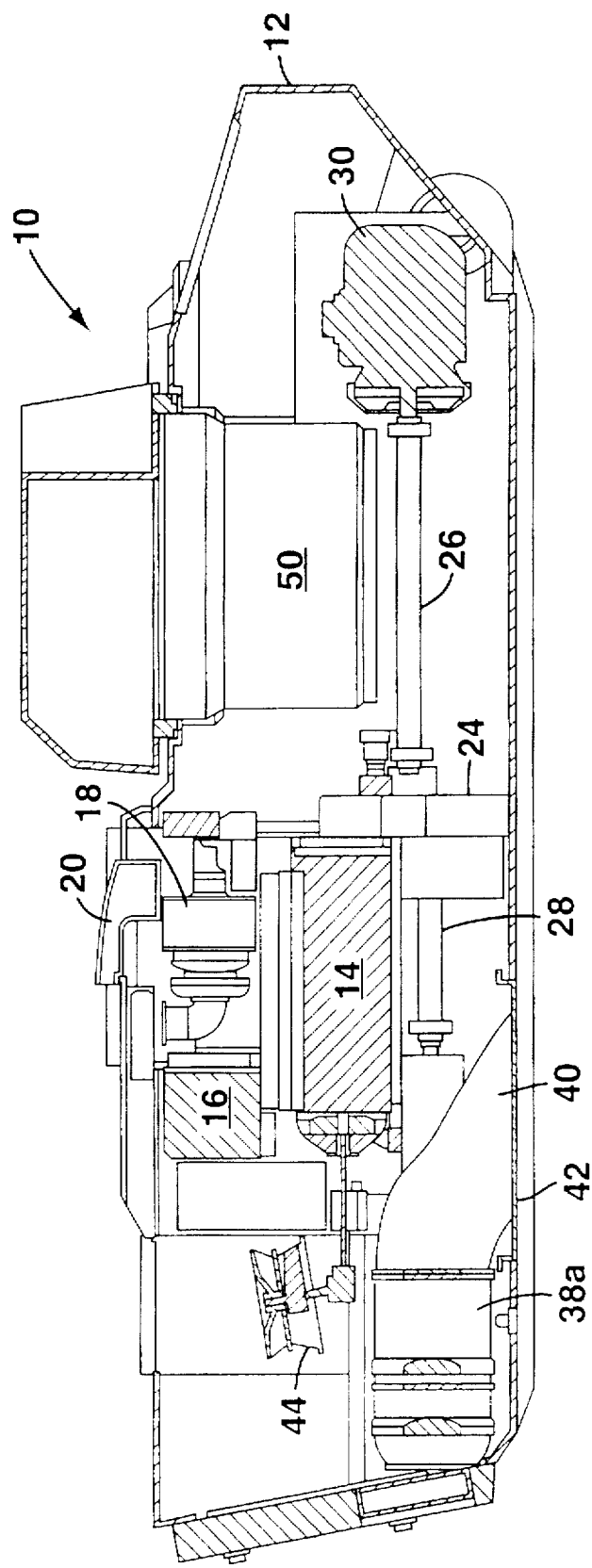
FIG_1

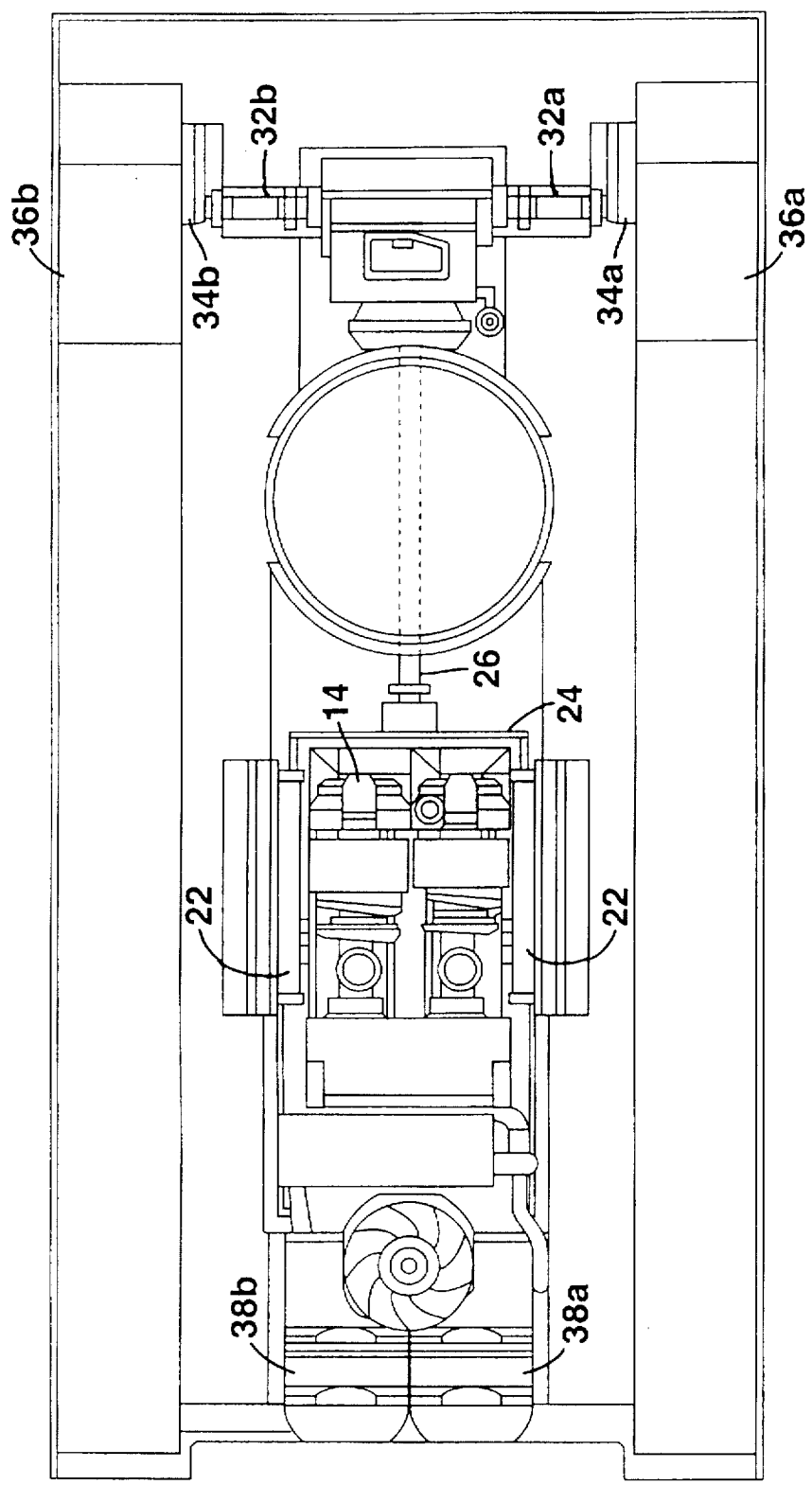
FIG_2

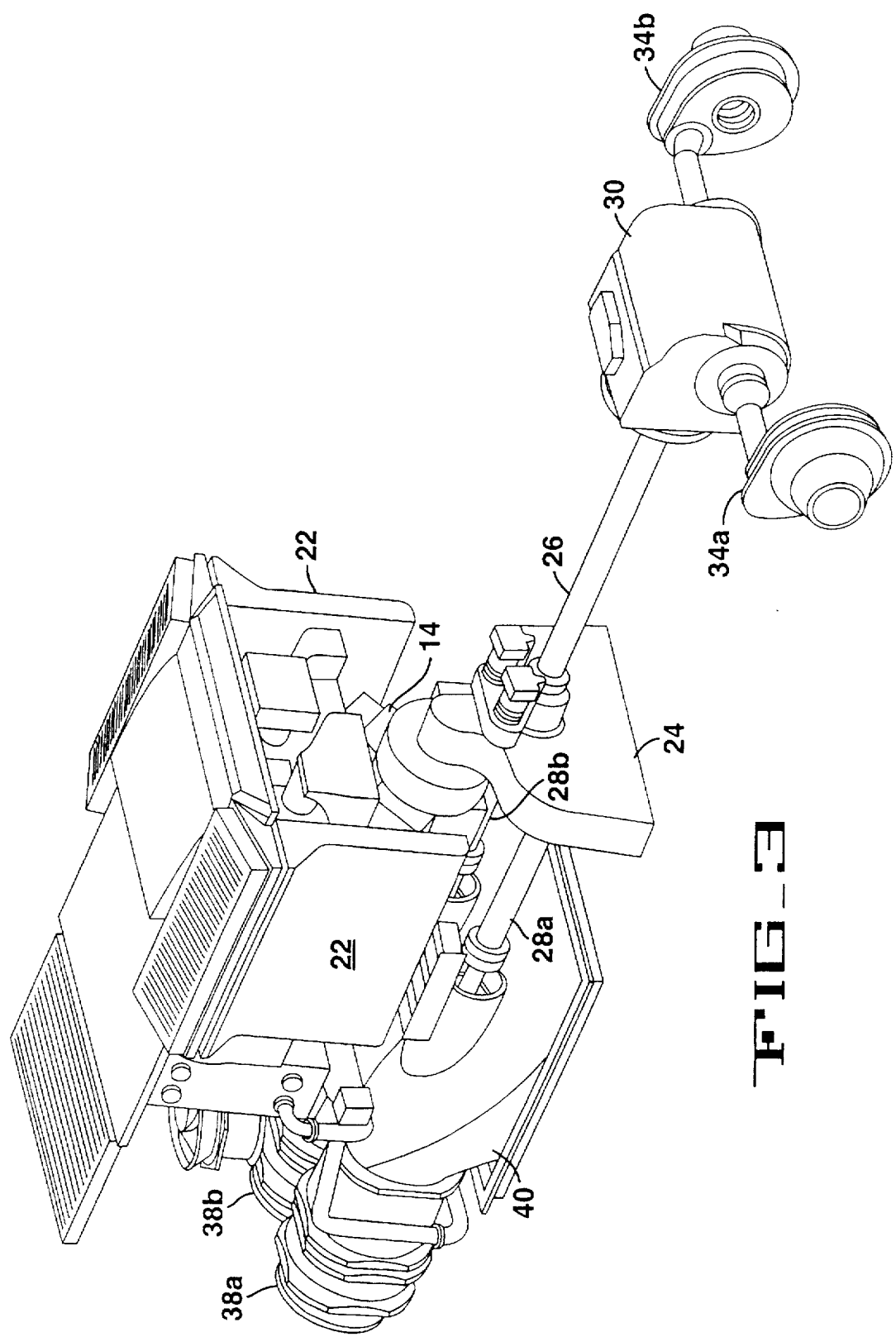
FIG_3

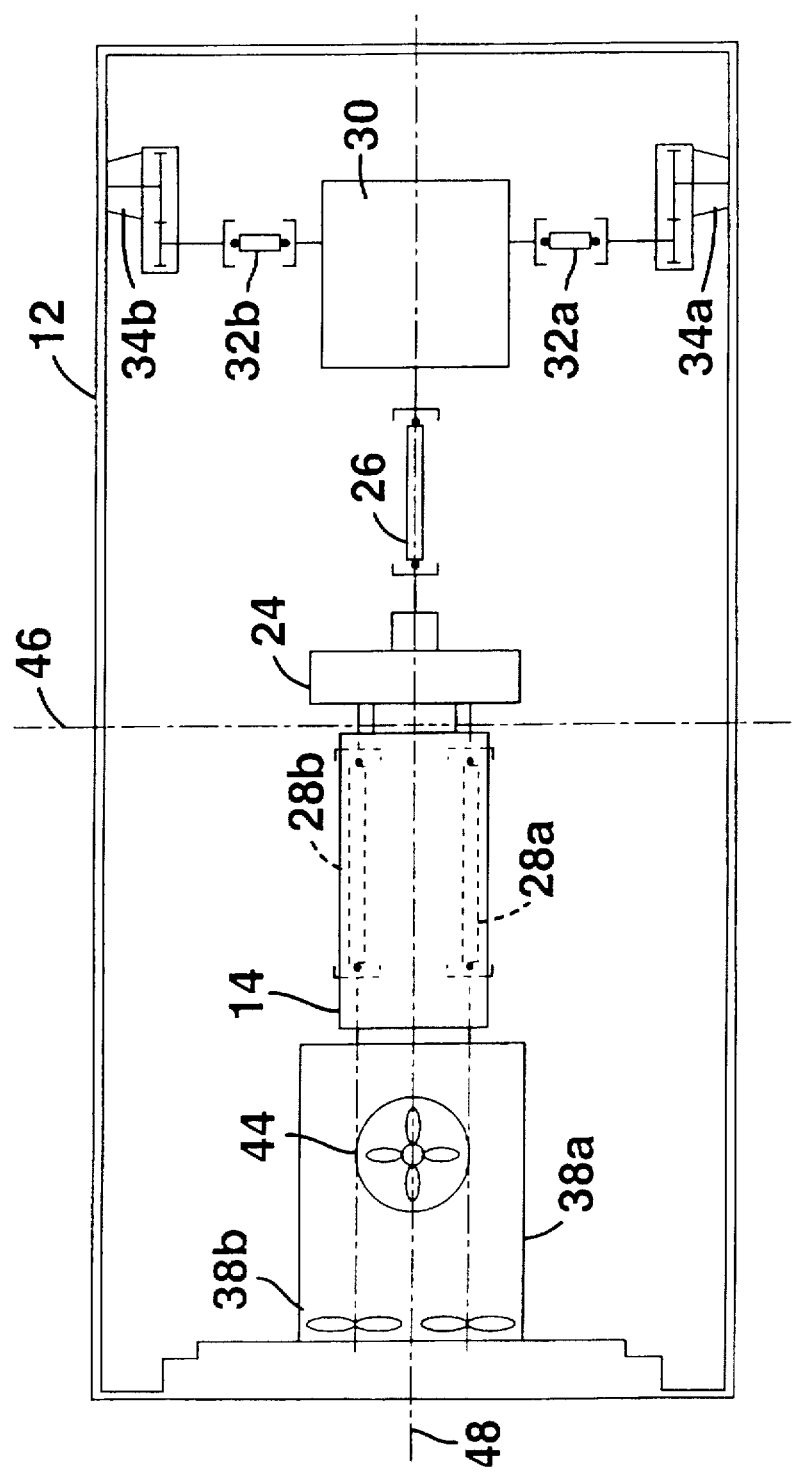
FIG_4

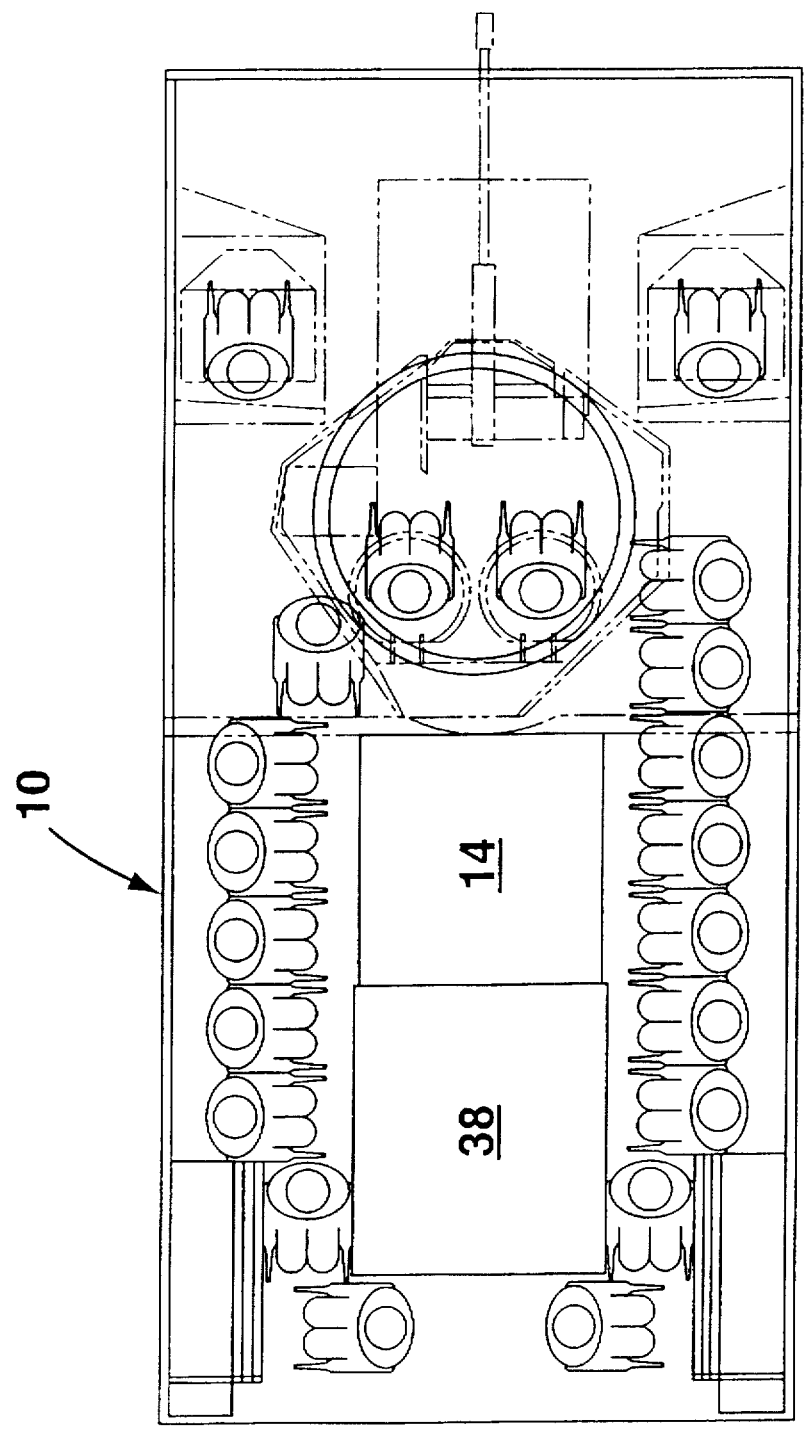
FIG_5

POWER TRAIN LAYOUT FOR AN AMPHIBIOUS VEHICLE

BACKGROUND OF THE INVENTION

1. Field of the Invention

This invention has to do with tracked amphibious vehicles having the capability to travel on land and on sea. The invention pertains to an integrated land and amphibious power train arranged in fit into an amphibious vehicle so as to allow the chassis length to be optimized for weight and mobility characteristics independently of the power train component size and arrangement. The power train configuration places two large waterjets along the center line of the vehicle to minimize structure and power train weight, and to minimize air ingested by the waterjets while the vehicle is operating at high speed on plane. The power train configuration also allows for waterjet or engine upsizing to accommodate alternate designs and/or upsizing for increased power and thrust without requiring an increase in the length of the vehicle. The power train arrangement further optimizes access to power train elements for service and/or repair.

2. Description of the Prior Art

In the prior art it has been common practice that vehicle power trains have been arranged for functionality with the total length of the integrated components a sum of the individual component lengths. In a track driven high speed amphibious vehicle using large scale waterjets for high speed water operation, the length of the linear sum of the component lengths can force the vehicle length to exceed that which is optimum for land and water mobility. As vehicles become longer than optimum to integrate their suspension systems they are more prone to track disengagement, to steering degradation and to decreased capability in traversing obstacles. Also, as the hull lengthens it becomes heavier which then requires more power and thrust to attain plane in high water speed operations, potentially exceeding the current technology for available power. To minimize waterjet air ingestion and propulsion gearbox efficiency losses to the waterjets while the vehicle is on or attempting to reach high speed plane, it is desired to place the waterjets inboard along the vehicle center line. The combined length of the center mounted waterjet assembly, engine, transfer propulsion gearbox, land transmission and other mission equipment can cause the vehicle to exceed length and consequently weight requirements. Placement of the power train components has a large impact on space for personnel or other equipment, and greatly affects access for service. The power train arrangement set forth herein provides unobstructed aisleways for personnel and, furthermore, it provides space for a two person weapons station.

Current state of the art of high speed tracked amphibious vehicles requires that they be weight and power train efficient to be able to provide good land mobility and to reach plane when operating in a high speed amphibious mode. To obtain the necessary efficiencies, the power train of the instant design minimizes losses from gear trains and provides for shared structure to support and house the mission components.

SUMMARY OF THE INVENTION

This invention is a power train configuration arranged in a tracked, high water speed amphibious vehicle to optimize propulsion efficiency, weight and maintenance access while providing a compact length that allows hull length selection to be independent (beyond a certain base need) of the power train component sizes. The power train components are arranged on and along the vehicle center line for efficiency, with the engine raised and located over the waterjet inlet plenum to shorten the assembled length of the power train. The engine power feeds into a single propulsion gearbox that directs the power forward to the land transmission and rearward, under the engine, to the waterjets. The number of gear meshes in the propulsion gearbox are minimized to reduce propulsion gearbox power losses to the waterjets. Since the engine and waterjets overlap along the vehicle length, the overall power train assembly is significantly shorter, and does not dictate the vehicle length beyond a certain minimum. The vehicle length is determined by land and water mobility considerations. If additional engine or waterjet length is required to obtain the required power or to accommodate alternate source components, their length can be accommodated within the existing vehicle length.

The central position of the engine, that is, its position inboard from the sidewalls of the vehicle or vessel, provides the vehicle maintenance crew with access to both sides of the engine while it is in the vehicle simply by removing access panels. The raised position of the engine allows access to its underside and removal of grilles and panels over the engine provides access to the engine top side. Most engine problems can be repaired with the engine in the vehicle greatly reducing maintenance down time compared to vehicles where the engine must be moved or removed for access. Having the engine in the center of the vehicle also provides good access to equipment mounted to the sidewalls of the vehicle, such as, for instance, suspension mounting components.

Placement of the engine rearward over the waterjet inlet plenum moves the vehicle center of gravity rearward, significantly enhancing suspension performance while on land and the dynamics of reaching high water speed necessary to maintain a planning attitude. Placement of the power train components along the vehicle center line allows items such as the engine and waterjets to share mounting structure. This minimizes weight and contributes to stiffening of the hull structure, reducing hull flex for better suspension dynamics and less opportunity for hull cracking.

All the engine's propulsive power is transferred into the propulsion gearbox from the flywheel end of the engine. This simplifies disconnect and installation of the engine if it has to be removed for major overhaul, and reduces the chance that torsional vibration problems will occur from removing power from both ends. Packaging the engine cooling system onto the engine allows the engine to be removed without breaking any cooling lines thus simplifying removal. Also, the engine and integrated cooling system can be checked for performance and leaks by being operated off or out of the vehicle the vehicle, ensuring it will be trouble free upon reinstallation. Central placement of the power train components provides straight, unobstructed aisleways on each side of the vehicle for ease and speed of personnel access and comfort in seating, without entanglement with components or other personnel.

One of the advantages of the invention is that the vehicle length is somewhat independent of the length of the power train components due to partially overlapping the lengths of the engine and waterjet assemblies.

An additional advantage of the invention is that the power train components are all mounted clustered closely along the vehicle center line for high operating and weight efficiency.

Another advantage of the invention is that alternate engine or waterjet components with longer length dimensions can be used without affecting the vehicle arrangement or total length.

One more advantage of the invention is that all the power train components and particularly the engine are mounted on or straddling the vehicle center line so that they can be easily accessed for service and repair, and that the engine does not need to be moved or removed for most service or repair activities.

One of the objects of the invention is to provide vehicle interior space to accommodate large mission essential items, such as a two man weapon station and seating space for 21 people.

A further object of this invention is to provide easy access to the vehicle interior for egress and ingress by personnel using straight, unobstructed aisleways.

Another object of the invention is to provide a convenient means of disconnecting the engine from the land transmission during selection of "land/neutral" as the gear selection for safety and during high water speed operation for efficiency, to reduce land transmission wear. The propulsion gearbox provides clutches for accomplishing this feature.

One further object of this invention is to locate the vehicle center of gravity as far to the vehicle rear as possible to enhance land suspension performance and the ability to reach high water speed plane with minimal power.

Also an object of this invention is to share mounting structure between power train components to minimize structure weight.

An additional object of this invention is to simplify engine removal and reliability by taking all engine propulsive power from one end of the engine.

Another object of this invention is to package the engine cooling system onto the engine so that no coolant filled lines must be removed during engine removal and so that the engine and cooling system can be operated and checked for leaks with the engine removed from the vehicle.

BRIEF DESCRIPTION OF THE DRAWINGS

The invention is clearly set out in the drawing figures in which:

FIG. 1 is a side elevation view of a representation of the vehicle, having some parts cut away to show the power train elements arranged inside the vehicle;

FIG. 2 is a plan view of a representative of the vehicle, having some parts cut away to show the power train elements arranged down the center line of the vehicle;

FIG. 3 is a three dimensional pictorial representation of the power train elements;

FIG. 4 is a pictorial representation of the power path through the power train elements;

FIG. 5 is a plan view of the vehicle showing the seating arrangement for the transient personnel, the driver and commander locations, and for the two man weapon station.

DESCRIPTION OF THE PREFERRED EMBODIMENT

The invention will be appreciated and understood through a perusal of the attached drawing figures in conjunction with reading the description of the invention set forth as follows.

FIG. 1 presents a partially sectioned and cross hatched view of a representation of an amphibious vehicle generally 10. The detail of this figure, and the other figures as well, shows only the detail necessary for communication of the invention to the public. The hull 12 contains the propulsion system for the vehicle in a unique package that serves to provide room for a contingent of marines, the operating crew, and the myriad drive equipment.

The primary engine 14 is located amidships and generally along a horizontal, longitudinal centerline of the vessel. Auxiliary engine elements including an air cleaner 16, a turbo charger 18, and a combustion air aspirator 20 which are located above the engine.

As best seen in FIG. 3 a pair of heat exchangers, each one identified as 22, are located on each side of the engine 14.

FIGS. 3 and 4 show that the primary drive from the engine 14 is directed to a propulsion gearbox 24 having several output capabilities. Of concern in this application is the land transmission drive shaft 26 and the marine driveshafts 28a and 28b. The land transmission driveshaft 26 provides drive from the propulsion gearbox 24 to the land transmission 30 located low in the hull 12 at the bow or front of the vehicle generally 10. By mounting the land transmission at the front of the vehicle significant space is made available for the weapons station 50, storage and other equipment. This land transmission 30 is generally mounted centered on the major axis of the vehicle as is the primary engine 14. The land transmission includes output drive elements 32a and 32b to drive the final drives 34a and 34b which are used to drive the tracks, normally positioned below the horizontal sponsons as 36a and 36b in FIG. 2.

The marine drive shafts, and there are two of them, 28a and 28b in FIG. 4, extend to the waterjets 38a and 38b from the propulsion gearbox 24. The waterjets 38 are mounted each as close to the major horizontal centerline of the vehicle as practical. That is, the inboard sides of the waterjets face each other and the horizontal centerline of the vehicle. There would be no space for man access between these waterjets. They are low in the hull 12 at the stern of the vessel. Each waterjet, 38a and 38b, includes an inlet such as 40 in FIGS. 1 and 3. These inlets can receive water inflow through a grill covered aperture 42 in the bottom hull section toward the rear of the vessel. The inlet to the waterjet is centrally located, straddling the vehicle centerline, between the sides of the hull as are the waterjets, the engine, the propulsion gearbox, and the transmission as previously pointed out. When waterborne it is helpful to minimize the ingestion of air into the waterjets. By placing the intake for the waterjets as inboard as possible from the outboard edges of the planar surface of the hull less air is available to be sucked into the waterjet inlet aperture by the waterjets.

A secondary output from the engine drives a cooling fan 44 also located on the central major axis of the vessel generally 10.

By adopting the equipment arrangement described above, the weight of the various components are not only centered as much as possible on the longitudinal centerline of the vessel but the bulk of the drive line weight is located aft of beam. This assists the craft in getting up on a plane when under power on water.

FIG. 5 shows crew and marine seating arrangements. The infantry marines will sit generally outboard of the centerline of the vessel with the engine 14, propulsion gearbox 24, and the waterjets, 38a and 38b, between facing rows of marines. Each side of the vehicle includes a straight, unobstructed aisleway for personnel access.

FIG. 4 is a schematic representation of the components of the drive line. From this figure the general layout of the equipment can be noted inside the hull represented as 12. An amidships construction line is 46 generally divides the front of the vessel from the stern portion. As can be seen in this schematic, the bulk and massive components of the drive line are to the aft of this amidships line.

A second construction line 48 represents the horizontal transverse axis of the vessel. This line gives a reference point to the location of the drive components being arranged generally on the longitudinal transverse or major axis of the vessel.

In conclusion it can be seen that the disclosure sets forth an amphibious vehicle with a lateral centerline and a planar hull surface having outboard perimeters wherein the planar hull surface is the base of the amphibious vehicle. The amphibious vehicle contains an engine or otherwise referred to as a prime mover which has a crankshaft defining the axial centerline of the prime mover. A pair of waterjets are also carried in the vehicle as is obvious. Each of these waterjets has an axial shaft which defines a horizontal centerline and each of the waterjets can be characterized as having inboard and outboard sides. The waterjets are located in the amphibious vehicle such that each of the waterjets' respective inboard sides is located immediately adjacent said lateral centerline of said amphibious vehicle. By "immediately adjacent" the inventors mean that the waterjets are side by side, one on each side of the lateral centerline thus leaving a passageway or aisleway between the outboard sides of the waterjets and the sides of the amphibious vehicle as is illustrated in the drawing figures. The waterjets are contained in said amphibious vehicle such that the horizontal centerline of at least one of the waterjets is positioned relatively below the horizontal centerline of the prime mover.

A propulsion gearbox is mounted in the amphibious vehicle as has been explained. The propulsion gearbox is connected, in conventional ways by an input shaft, output shafts and attendant drive shafts as shown, to the engine, to the waterjets and to the land transmission.

This propulsion gearbox has a plurality of output shafts including a land transmission output shaft and a pair of waterjet output shafts.

The land transmission is, of course, for use in propelling the amphibious vehicle when it is not being propelled by the waterjets in a seagoing capacity. The land transmission is mounted in said amphibious vehicle forward of the propulsion gearbox and well forward of the horizontal center line of the vehicle in order to make room for the weapons station 50 shown in FIG. 2. The input shaft to the land transmission is connected to the land transmission output shaft of the propulsion gearbox.

The waterjets include a pair of inlet plenums connected between the waterjets and an inlet aperture through the planar surface on the underside of the vehicle. The inlet aperture is located such as to straddle or be intersected by the lateral centerline of said amphibious vehicle with the intent that the inlet aperture be significantly inboard of the outboard perimeters of the planar surface. The engine placement, generally amidships, but biased toward the rear of the vehicle as shown in FIG. 1, is so positioned to locate the vehicle center of gravity rearward in the vehicle.

This configuration of the major power components is adopted so that the drive line components do not determine the vehicle length, after providing for at least a minimum length, thus allowing the length to be optimized for land mobility and system weight.

Furthermore the placement of the pair of waterjets on the vehicle center line helps control cavitation due to the waterjets not ingesting air, such air being more prevalent outboard of the general area of the vehicle center line.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the spirit and scope of the invention.

What is claimed is:

1. An amphibious vehicle with a lateral centerline and a planar hull surface having outboard perimeters, said planar hull surface comprising the base of said amphibious vehicle:

said amphibious vehicle containing a prime mover having a crankshaft defining the axial centerline of said prime mover;

a pair of waterjets with inboard and outboard sides, each of said waterjets located in said amphibious vehicle such that each of said waterjets' respective inboard side is located immediately adjacent the lateral centerline of said amphibious vehicle and where each of said waterjets has an axial shaft defining a horizontal centerline said waterjets contained in said amphibious vehicle such that said horizontal centerline of at least one of said waterjets is positioned relatively below said horizontal centerline of said prime mover and said waterjets include a pair of inlet plenums connected between said waterjets and an inlet aperture through said planar surface on the underside of said vehicle, said inlet aperture located such as to be intersected by said lateral centerline of said amphibious vehicle, and said inlet aperture significantly inboard of the outboard perimeters of said planar surface.

2. An amphibious vehicle with a lateral centerline and a planar hull surface having outboard parameters, said planar hull surface comprising the base of said amphibious vehicle;

said amphibious vehicle containing a prime mover having a crankshaft defining the axial centerline of said prime mover;

a pair of waterjets each of said waterjets having an axial shaft defining a horizontal centerline and each of said waterjets having inboard and outboard sides, said waterjets located in said amphibious vehicle such that each of said waterjets' respective inboard sides is located immediately adjacent said lateral centerline of said amphibious vehicle, said waterjets contained in said amphibious vehicle such that said horizontal centerline of at least one of said waterjets is positioned relatively below said horizontal centerline of said prime mover;

a propulsion gearbox mounted in said amphibious vehicle, said propulsion gearbox having a plurality of output shafts including a land transmission output shaft and a pair of waterjet output shafts;

a land transmission mounted in said amphibious vehicle, said land transmission located forward of said propulsion gearbox and connected to said land transmission output shaft of said propulsion gearbox;

said waterjets include a pair of inlet plenums connected between said waterjets and an inlet aperture through said planar surface on the underside of said vehicle, said inlet aperture located such as to be intersected by said lateral centerline of said amphibious vehicle, said inlet aperture significantly inboard of the outboard perimeters of said planar surface.

3. A power train arrangement for a high water speed amphibious tracked vehicle having a planar surface making up the bottom of said vehicle, which configures the major power components so that they do not determine the vehicle length, allowing the length to be optimized for land mobility and system weight, the power train arrangement comprising:

- a pair of waterjets placed on the vehicle center line whereby cavitation in said waterjets is minimized due to said waterjets not ingesting air, such air being more prevalent outboard of the general area of the vehicle center line, said waterjets further sharing mounting structure with other power train components;
- a waterjet inlet plenum straddling said vehicle center line, said inlet plenum including an aperture in said planar surface of said vehicle;
- an engine for driving said vehicle, said engine located in the vehicle in position generally above said waterjet inlet plenum whereby said engine placement serves to facilitate a short power train length and to locate the vehicle center of gravity rearward, said engine provided to drive said waterjets;
- a land transmission for use in propelling the vehicle when said vehicle is not being propelled by said waterjets;
- a propulsion gearbox connected to said engine, to said waterjets and to said land transmission.

4. The invention in accordance with claim 3 further comprising an engine cooling system integrated with said engine whereby removal of said engine will include removal of said engine cooling system allowing for ease of engine removal and engine testing outside of said vehicle.

5. The invention in accordance with claim 3 wherein the placement of said waterjets and said engine is such so that a passageway is formed between said waterjets, said engine, and the lateral outer perimeters of the interior of said amphibious tracked vehicle, said passageway providing access to components of said vehicle which pass from the exterior of said vehicle to said interior of said vehicle whereby said components, such as elements of exteriorly mounted suspension components may be accessed from said passageway without the need of removing said waterjets or said engine or being otherwise encumbered by their placement when access to components accessable from said passageway is required.

6. An amphibious vehicle with a lateral centerline and a planar hull surface having outboard perimeters, said planar hull surface comprising the base of said amphibious vehicle;

said amphibious vehicle containing a prime mover having a crankshaft defining the axial centerline of said prime mover;

a propulsion gearbox is mounted in said amphibious vehicle, said propulsion gearbox having a plurality of output shafts including a land transmission output shaft and a pair of waterjet output shafts;

a pair of waterjets with inboard and outboard sides, each of said waterjets located in said amphibious vehicle such that each of said waterjets' respective inboard side is located immediately adjacent the lateral centerline of said amphibious vehicle, said waterjets including a pair of inlet plenums connected between said waterjets and an inlet aperture through said planar surface on the underside of said vehicle.

7. The invention in accordance with claim 6 wherein said inlet aperture is located to be intersected by said lateral centerline of said amphibious vehicle.

8. The invention in accordance with claim 7 wherein said inlet aperture is significantly inboard of the outboard perimeters of said planar surface.

\* \* \* \* \*